United States Patent
Kahler et al.

(10) Patent No.: US 10,654,012 B2
(45) Date of Patent: May 19, 2020

(54) PORTABLE CONTAINER MIXING STATION

(71) Applicant: Kahler Automation, Fairmont, MN (US)

(72) Inventors: Wayne Henry Kahler, Fairmont, MN (US); Logan Quinn Kahler, Fairmont, MN (US); Bruce Roy Gemmill, Fairmont, MN (US); Scott Robert Gemmill, Fairmont, MN (US); Dennis Dale Turner, Fairmont, MN (US)

(73) Assignee: Kahler Automation Corporation, Fairmont, MN (US)

( * ) Notice: Subject to any disclaimer, the term of this patent is extended or adjusted under 35 U.S.C. 154(b) by 54 days.

(21) Appl. No.: 15/850,582

(22) Filed: Dec. 21, 2017

(65) Prior Publication Data

US 2018/0178177 A1    Jun. 28, 2018

Related U.S. Application Data (60) Provisional application No. 62/437,997, filed on Dec. 22, 2016.

(51) Int. Cl.
*B01F 13/00* (2006.01)
*B01F 15/00* (2006.01)
(Continued)

(52) U.S. Cl.
CPC ...... *B01F 13/003* (2013.01); *B01F 15/00876* (2013.01); *B65D 88/54* (2013.01);
(Continued)

(58) Field of Classification Search
CPC ............. B01F 13/003; B01F 15/00876; B65D 2217/00; B65D 88/02; B65D 88/54; B65D 88/74; C05G 1/00
See application file for complete search history.

(56) References Cited

U.S. PATENT DOCUMENTS

| | | | | |
|---|---|---|---|---|
| 3,976,087 A | * | 8/1976 | Bolton | A01M 7/0092 137/15.01 |
| 4,716,932 A | * | 1/1988 | Adams, Jr. | B01F 3/1271 137/565.29 |

(Continued)

OTHER PUBLICATIONS

International Search Report and Written Opinion issued by the ISA/Us, Commissioner for Patents, dated Feb. 16, 2018, for International Application No. PCT/US2017/067901; 5 pages.

*Primary Examiner* — Tony G Soohoo
(74) *Attorney, Agent, or Firm* — Faegre Drinker Biddle & Reath LLP (57) ABSTRACT

A mixing station is provided, comprising: a standard shipping container having a floor, a pair of side walls and at least one door at one end of the container; an end wall positioned adjacent the one end of the container, the end wall including a plurality of couplings; at least one internal wall disposed within the container to define, with the end wall, a room; and mixing components disposed within the room; wherein ingredients external to the container are provided to the mixing components through the plurality of couplings in the end wall and a final mixture of the ingredients is provided from the mixing components to an output container through the plurality of couplings such that the side walls of the container are not structurally compromised.

22 Claims, 12 Drawing Sheets

(51) Int. Cl.
*B65D 88/74* (2006.01)
*B65D 88/54* (2006.01)
*C05G 1/00* (2006.01)
*B65D 88/02* (2006.01)

(52) U.S. Cl.
CPC ............ *B65D 88/74* (2013.01); *B65D 88/02* (2013.01); *B65D 2217/00* (2013.01); *C05G 1/00* (2013.01)

(56) References Cited

U.S. PATENT DOCUMENTS

| | | | | |
|---|---|---|---|---|
| 5,055,204 | A * | 10/1991 | Bogart | B09C 1/00 210/195.1 |
| 5,769,536 | A | 6/1998 | Kotylak | |
| 8,568,016 | B2 * | 10/2013 | Hughes | G05D 11/139 366/142 |
| 8,905,627 | B2 * | 12/2014 | Noles, Jr. | B01F 3/0865 366/182.2 |
| 8,905,740 | B2 * | 12/2014 | Lim | B28B 5/04 425/135 |
| 8,915,691 | B2 * | 12/2014 | Mintz | B65D 88/54 198/533 |
| 9,015,801 | B1 * | 4/2015 | Bhatia | G06F 21/31 726/2 |
| 2005/0167448 | A1 | 8/2005 | Schall et al. | |
| 2015/0016209 | A1 | 1/2015 | Barton et al. | |
| 2015/0368136 | A1 * | 12/2015 | Raymont | C02F 1/008 210/662 |
| 2018/0175429 | A1 * | 6/2018 | Gottlieb | H01M 2/0257 |
| 2018/0175430 | A1 * | 6/2018 | Modderno | H01M 8/249 |
| 2018/0178177 | A1 * | 6/2018 | Kahler | B01F 13/003 |
| 2018/0297878 | A1 * | 10/2018 | Raymont | C02F 1/001 |
| 2018/0328643 | A1 * | 11/2018 | Eddy | F25B 25/005 |

* cited by examiner

PORTABLE CONTAINER MIXING STATION

CROSS-REFERENCE TO RELATED APPLICATIONS

This application claims priority to U.S. Provisional Application No. 62/437,997, filed on Dec. 22, 2016, the entire disclosure of which is hereby expressly incorporated by reference.

TECHNICAL FIELD

The present invention relates generally to systems for mixing liquids and additives, and more particularly to a portable mixing station disposed within a standard shipping container.

BACKGROUND

It is desirable for a variety of different applications to mix bulk material at its storage location to create a desired blend of materials for loading onto an outlet container such as a tanker truck or train car. For example, it is desirable to blend bulk fertilizer ingredients, both liquid and dry, stored at a facility for loading onto tanker trucks for delivery to end users.

It is known to ship self-contained mixing stations enclosed within shipping containers for installation at bulk material storage sites. Once shipped to a particular installation site, the various pumps, valves and meters of the mixing station are connected to the tanks of bulk material. In known systems, the plumbing connections are made through holes formed in the side walls of the shipping container that encloses the mixing equipment. As a result, the structural integrity of the shipping container is compromised rendering it unsuitable for shipping to another location, especially using a sea-going vessel. Consequently, known mixing stations are essentially single-installation systems.

It would be useful to provide a mixing station enclosed within a standard shipping container that can be installed and connected to bulk storage tanks at an installation without requiring connection to or penetration of the side walls of the container. Such a mixing station would be portable and could be shipped to various mixing sites for use.

SUMMARY

According to one embodiment, the present disclosure provides a mixing station, comprising: a standard shipping container having a floor, a pair of side walls and at least one door at one end of the container; an end wall positioned adjacent the one end of the container, the end wall including a plurality of couplings; at least one internal wall disposed within the container to define, with the end wall, a room; and mixing components disposed within the room; wherein ingredients external to the container are provided to the mixing components through the plurality of couplings in the end wall and a final mixture of the ingredients is provided from the mixing components to an output container through the plurality of couplings such that the side walls of the container are not structurally compromised.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

While the present disclosure is amenable to various modifications and alternative forms, specific embodiments have been shown by way of example in the drawings and are described in detail below. The present disclosure, however, is not to limit the particular embodiments described. On the contrary, the present disclosure is intended to cover all modifications, equivalents, and alternatives falling within the scope of the appended claims.

DETAILED DESCRIPTION

Figure 1:
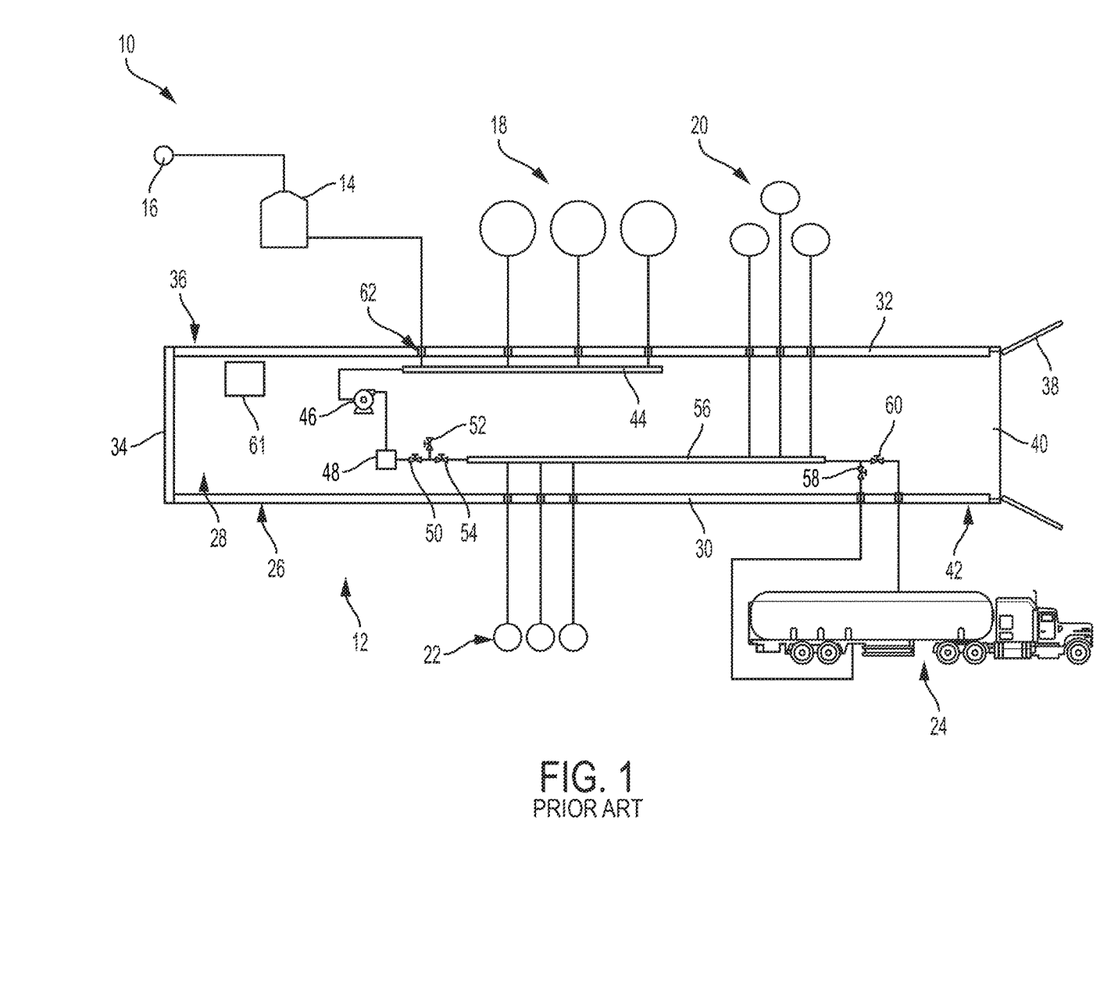
FIG. 1 is a flow diagram of a mixing system using a prior art mixing station.

FIG. 1 depicts a mixing system 10 using a prior art container mixing station 12. Mixing system 10 generally includes mixing station 12, a water tank 14 which may be fluidly coupled to a water source 16, a plurality of liquid storage tanks 18, a plurality of auxiliary liquid storage tanks 20, a plurality of additive storage tanks 22 and a load outlet container 24, in this case depicted as a tanker truck. It should be understood that various flow meters, valves, etc. are intentionally omitted from FIG. 1 to simplify the drawing and accompanying description. Additionally, it should be understood that FIG. 1 is not intended to depict the placement of the various components of system 10, including components in container mixing station 12. Rather, the intent is to depict the flow of liquids and additives through system 10.

The plurality of liquid storage tanks 18 is depicted as including three tanks 18, although it should be understood that more or fewer than three tanks 18 may be used. Tanks 18 may be stand-alone tanks configured to store quantities of liquid such as, for example, fertilizer chemicals. Alternatively, tanks 18 may be portable. Similarly, auxiliary liquid storage tanks 20 are depicted as including three tanks 20, although it should be understood that more or fewer than three tanks 20 may be used. Tanks 20 may be stand-alone tanks configured to store quantities of liquid such as, for example, herbicides. Alternatively, tanks 20 may be portable. Likewise, additive storage tanks 22 are depicted as including three tanks 22, although it should be understood that more or fewer than three tanks 22 may be used. Tanks 22 may be stand-alone tanks configured to store quantities of additives such as, for example, fertilizers, herbicides, insecticides, micro nutrients as well as chemicals or additives used for pollution control and spill clean up. Alternatively, tanks 22 may be portable.

Mixing station 12 includes a standard shipping container 26 configured to house the various components described herein. Container 26 includes a floor 28, a pair of side walls 30, 32, an end wall 34 at one end 36 of container 26, a roof (not shown), and a pair of doors 38 to permit access to an opening 40 at another end 42 of container 26. Enclosed within container 26 are an inlet manifold 44, a pump 46, a mass flow meter 48, a control valve 50, a purge valve 52, a low flow valve 54, an outlet manifold 56, a first discharge valve 58 and a second discharge valve 60.

Water tank 14 is fluidly coupled to inlet manifold through a coupling 62 mounted in side wall 32. Similarly, liquid storage tanks 18 are fluidly coupled to inlet manifold through couplings 62 mounted in side wall 32 and auxiliary liquid storage tanks 20 are fluidly coupled to outlet manifold 56 through couplings 62 mounted in side wall 32. Additive storage tanks 22 are fluidly coupled to outlet manifold 56 through couplings 62 mounted in side wall 30. First discharge valve 58 is fluidly coupled to a bottom fill coupling (not shown) of load outlet container 24 through a coupling 62 mounted in side wall 30, and second discharge valve 60 is fluidly coupled to a top fill coupling (not shown) of load outlet container 24 through a coupling 62 mounted in side wall 30.

In operation, liquid from water tank 14 and liquid storage containers 18 is drawn into inlet manifold 44 by pump 46. The quantities of liquid from each of water tank 14 and liquid storage containers 18 are controlled by inlet valves (not shown), which are air actuated under control of a controller 61. Flow from inlet manifold 44 is monitored by flow meter 48 and controlled by control valve 50. Depending upon the desired flow from inlet manifold 44, low flow valve 54 is controlled to permit mixing with additives from additive storage tanks 22. Additives from additive storage tanks 22 are mixed with the output of low flow valve 54 at outlet manifold 56 as determined by air actuated valves (not shown) under control of controller 61. In the example shown, auxiliary liquids from auxiliary liquid storage tanks 20 are also mixed (under control of controller 61) at outlet manifold 56. The resulting outlet fluid/additive mixture is provided through one or both of first discharge valve 58 and/or second discharge valve 60 to load outlet container 24.

While the present disclosure using a primary example of mixing and blending fertilizers and herbicides, it should be understood that mixing station 12 may have many different applications for blending mixing and/or measuring different types of liquids. For example, mixing station 12 may be used to clean up an oil spill where the components could include a surfactant, an anti-foaming agent and a clotting agent. All of these components could be measured and documented by mixing station 12.

As should be apparent from the foregoing, side walls 30, 32 of container 12 are structurally compromised by the formation of the plurality of openings required for the mounting of the plurality of couplings 62. Consequently, container 12 is no longer structurally sound and sea-worthy. Container 12 is essentially suitable for a single installation, and is not portable.

Figure 2:
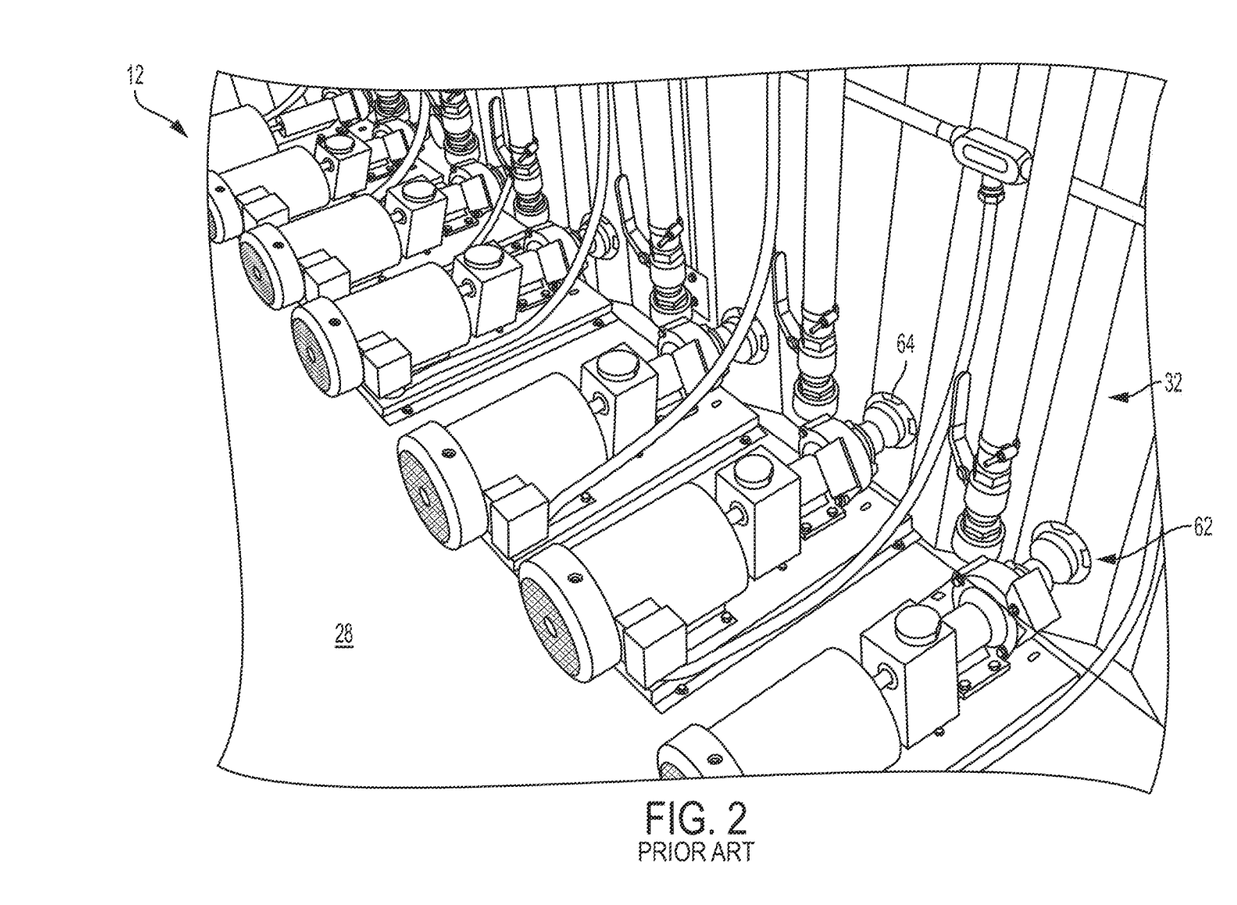
FIGS. 2 through 6 are photographs of various aspects of the prior art mixing station of FIG. 1.

FIGS. 2-6 depict the various couplings 62 described above and other aspects of container 12. As shown in FIG. 2, couplings 62 are mounted in openings 64 formed directly into the ribbed structure of side wall 32. These openings 64 weaken container 12 and permit liquids to flow into and out of container 12. If, for example, a leak is developed in one of the various components in container 12, chemicals may pool on floor 28 and ultimately escape container 12 and contaminate the environment at the location of container 12. Additionally as shown in FIG. 2, container 12 does not include insulation.

Figure 3:
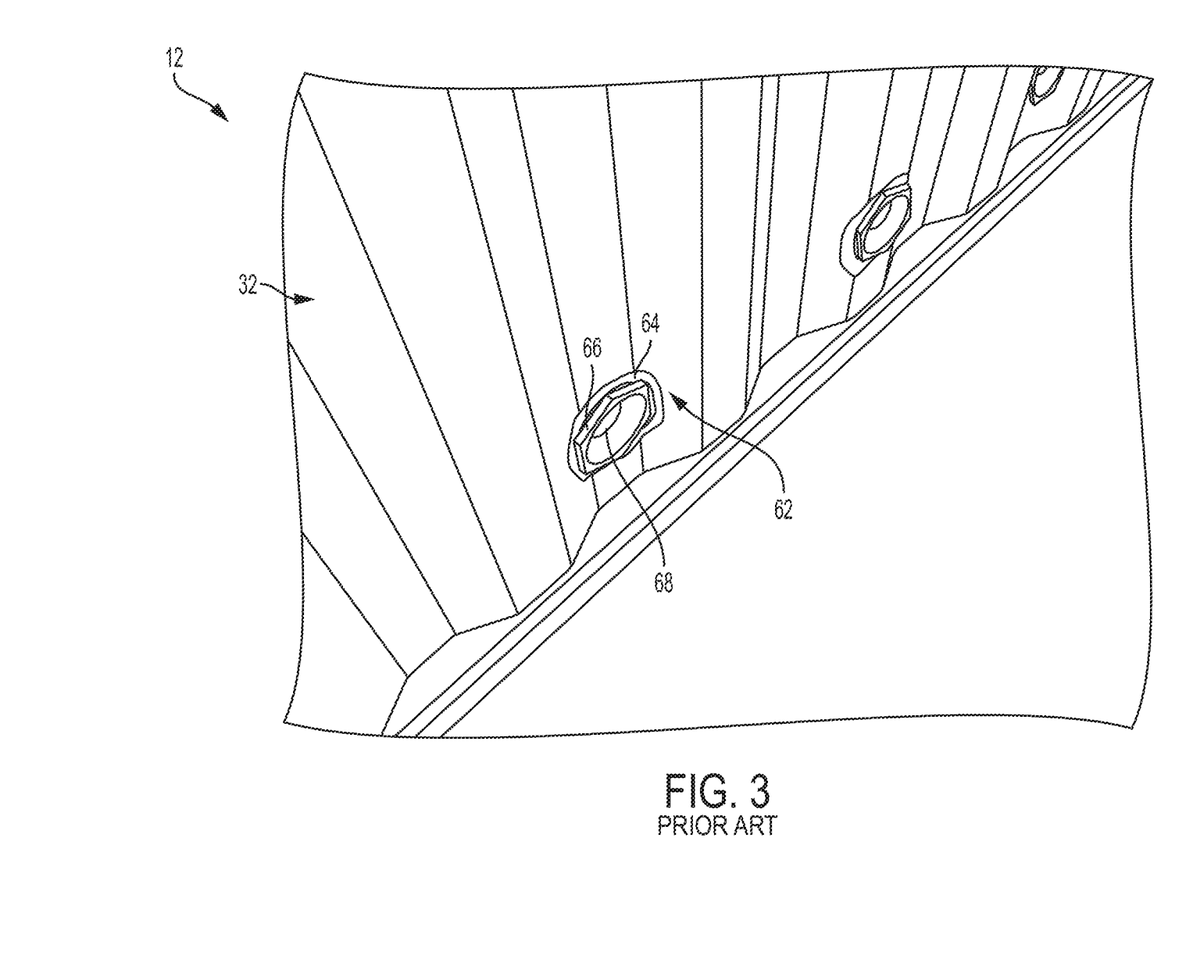

FIG. 3 best shows couplings 62 mounted in openings 64. Couplings 62 include a chase nipple 66 which protects the hose coupled to container 12 from damage resulting from sharp edges of openings 64, and a king nipple 68. The end of each hose is slid onto a king nipple 68 and a hose clamp (not shown) is used to secure the connection.

Figure 4:
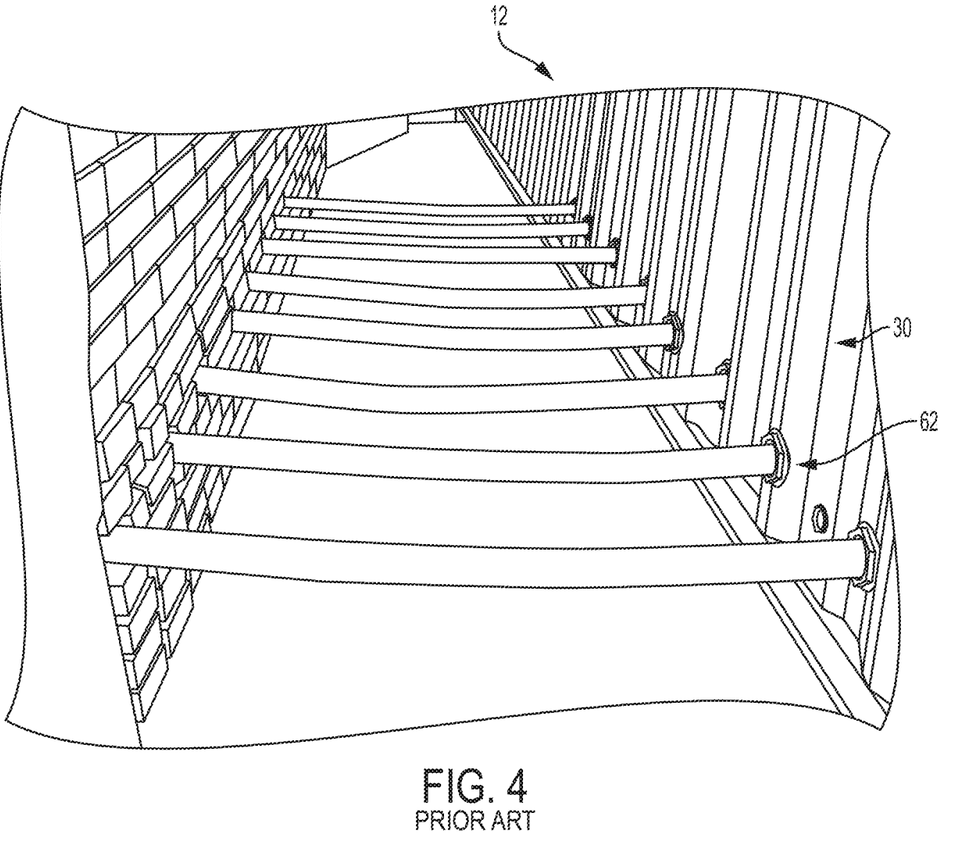
Figure 5:
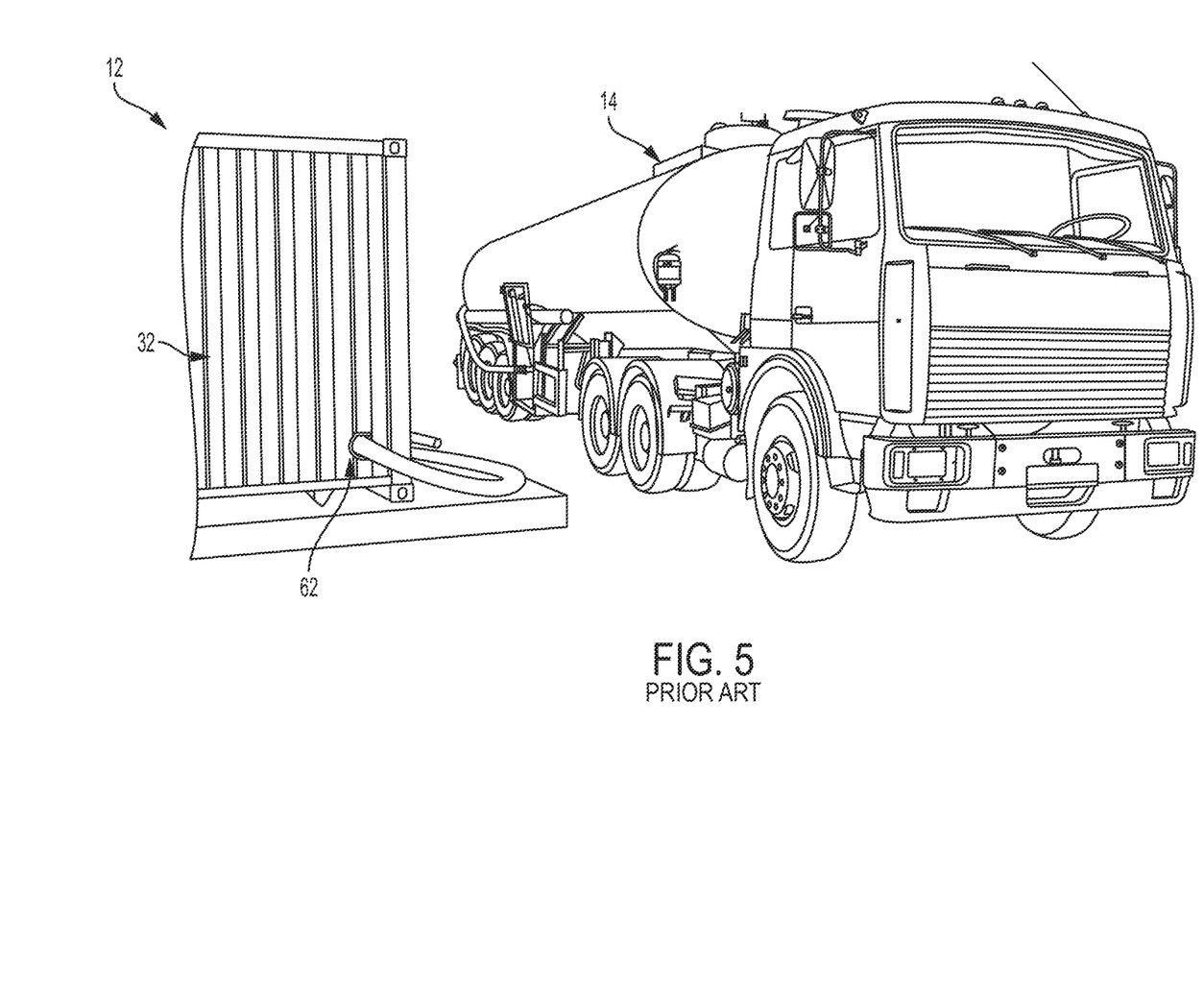
Figure 6:
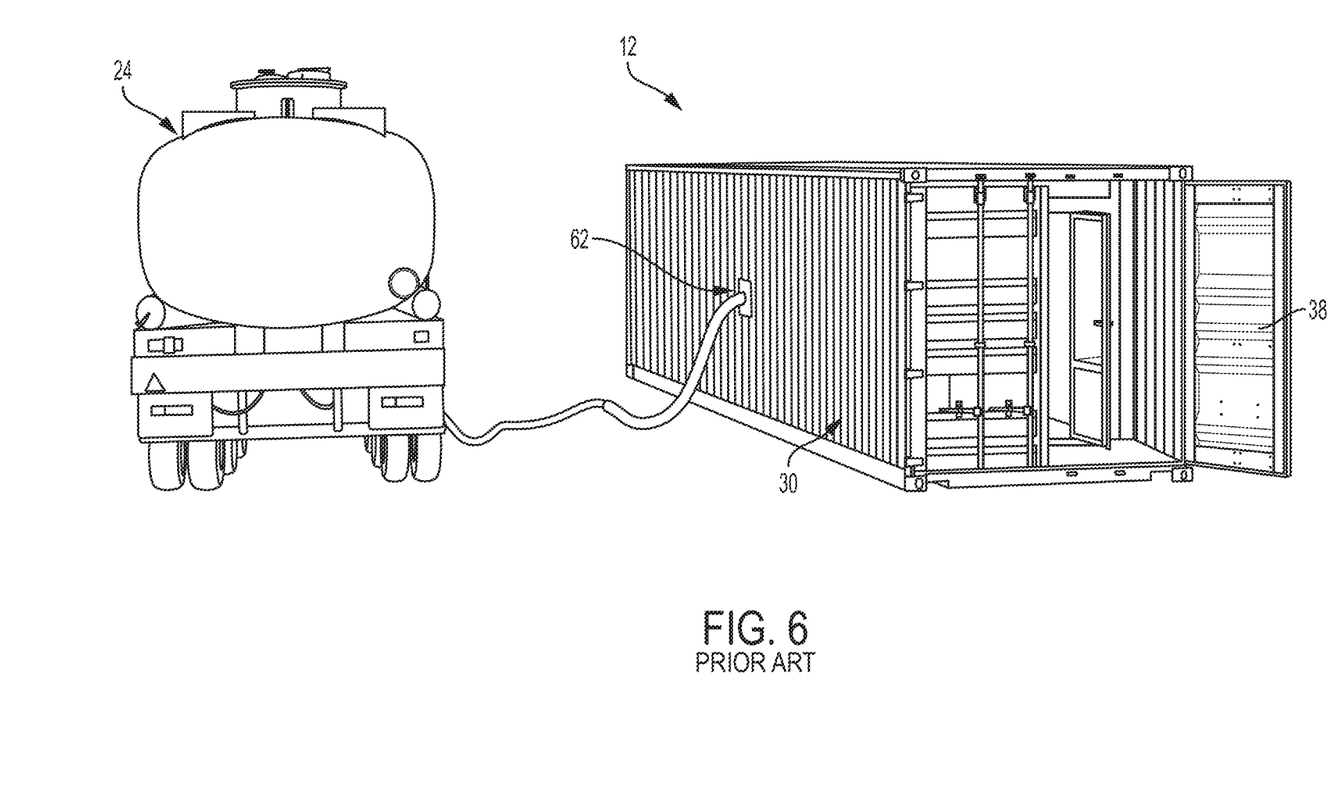

FIG. 4 shows the routing of additives from a storage building into container 12 through couplings 62 mounted in side wall 30. FIG. 5 shows delivery of, for example, water from water storage tank 14 (in this example, a tanker truck) into container 12 through a coupling 62 mounted in side wall 32. Finally, FIG. 6 shows the loading of load outlet container 24 through a coupling 62 mounted in side wall 30.

Figure 7:
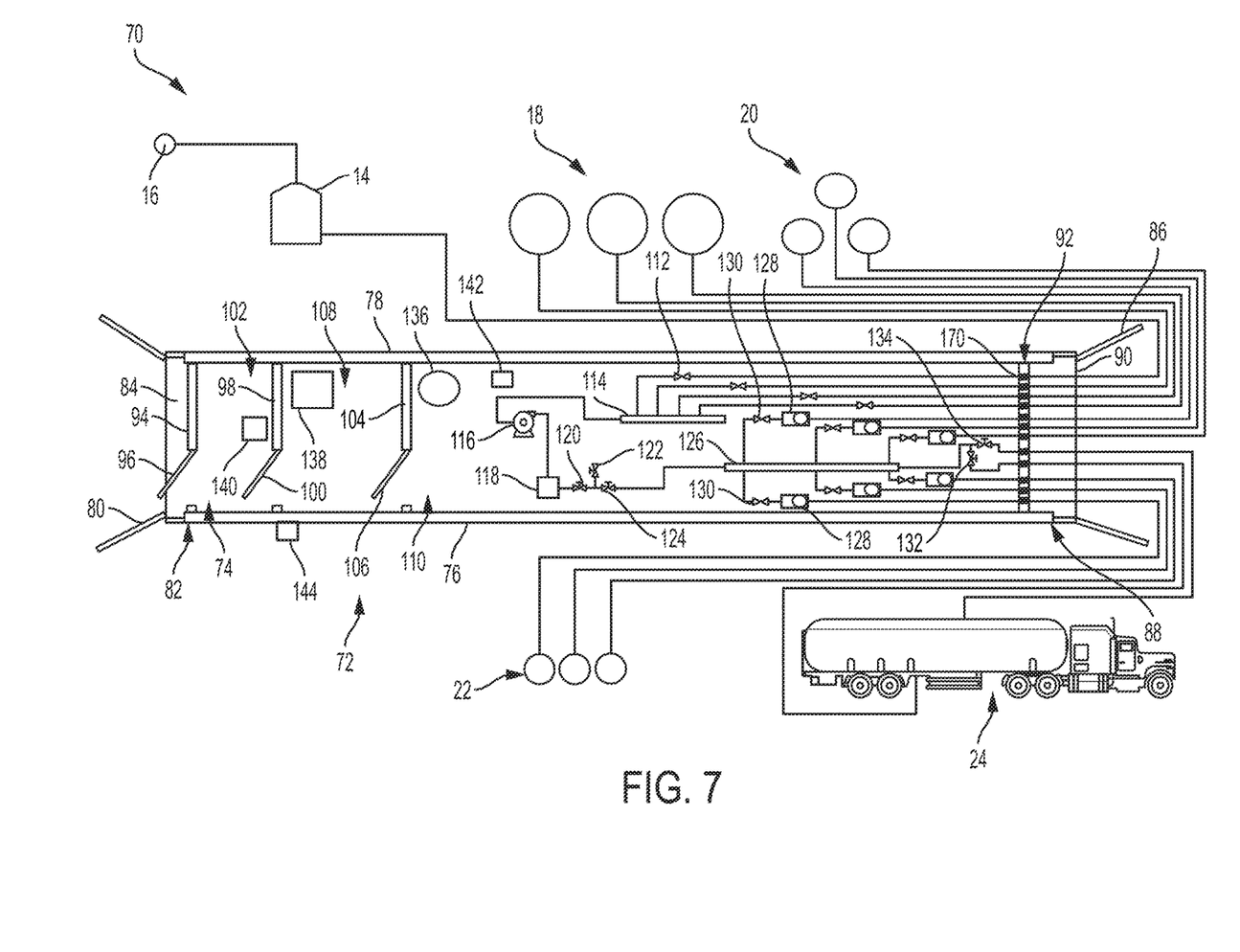
FIG. 7 is a flow diagram of a mixing system using a mixing station according to one embodiment of the present disclosure.

Referring now to FIG. 7, a mixing system 70 according to one embodiment of the present disclosure is shown. Mixing system 70 includes all of the same components as system 10 of FIG. 1 (except container 12). Therefore, the same reference numbers are used for like components and the description of those components provided above will not be repeated. In system 70, portable mixing station or container 72 is provided instead of container 12 of FIG. 1.

Container 72 generally includes a floor 74, a roof (not shown), a pair of side walls 76, 78, a pair of doors 80 at one end 82 that provide access to an opening 84, and a pair of doors 86 at another end 88 that provide access to an opening 90. Container 72 further includes an end wall 92 through which all inlet and outlet couplings are made in a manner that is further described below. A first internal wall 94 is positioned adjacent end 82 of container 72 and includes an accompanying door 96. A second internal wall 98 is further inset from end 82 of container 72 and includes an accompanying door 100. Walls 94, 98 and the accompanying doors 96, 100 together define a first room 102 within container 72. In one embodiment, first room 102 is configured as an office as is further described herein. Container 72 further includes a third internal wall 104 with an accompanying door 106, which together with second internal wall 98 and door 100 define a second room 108. In one embodiment of the present disclosure, second room 108 is an electrical room as is further described herein. Third internal wall 104 and door 106 together with end wall 92 define a third room 110. In one embodiment, third room 110 is a mechanical room as is further described herein.

Each of water tank 14 and the plurality of liquid storage tanks 18 are coupled through end wall 92 to an inlet valve 112, the outlet of which being coupled to an inlet manifold 114. The outlet of inlet manifold 114 is coupled to a pump 116, which delivers the mixture from inlet manifold 114 to a mass flow meter 118. Mass flow meter 118 provides information to controller 138 for use in controlling the delivery of liquid from inlet manifold 114. Mass flow meter 118 is coupled to a control valve 120, which is coupled to a purge valve 122 and a low flow valve 124 in the manner described above with reference to container 12. The outlet of low flow valve 124 is coupled to outlet manifold 126. Each of auxiliary liquid storage tanks 20 and additive storage tanks 22 are coupled through end wall 92 to a corresponding pump/flow meter 128, the outlet of which is routed through an inlet valve 130 to outlet manifold 126. Pump/flow meters 128 are in communication with controller 138 to permit controller 138 to control and monitor the delivery of materials to outlet manifold 126. The outlet of outlet manifold 126 is coupled to a first discharge valve 132 and a second discharge valve 134, the outlets of which are coupled through end wall 92 to a bottom fill coupling (not shown) and a top fill coupling (not shown) of load outlet container 24, respectively.

Each of the valves described above is, in one embodiment, air actuated. A compressor 136 is included in third room 110 to provide compressed air to actuate the valves under control of controller 138 situated in second room 108 as described herein. As is further described herein, the operation of controller 138 may be directed and/or monitored remotely such as by a remote interface device. A remote interface device 140 is shown in first room 102 of container 72. It should be understood, however, that remote interface device 140, which may be a smart phone, iPad, laptop, etc. coupled to controller 138 over one or more networks, may be located anywhere. In certain embodiments of the present disclosure, controller 138 hosts a web server (e.g., an HTTP server). In such embodiments, remote interface device 140 includes a web browser (e.g., an HTTP client). Controller 138 may be controlled remotely through page(s) hosted through its web server, which is accessed from remote interface device's 140 web browser. Remote interface device's 140 web browser transmits control and is updated using, for example, AJAX, which is a part of the page(s) hosted by controller 138.

Finally, as is further described herein, third room 110 of container 72 also includes a leak sensor 142 such as a float switch for detecting the presence of leaked fluid in third room 110. Leak sensor 142 is in communication with controller 138. When controller 138 receives a signal from leak sensor 142 indicating the presence of leaked fluid in third room 110, controller activates an alarm 144, which may include an audible alarm (e.g., a horn) and/or a visual alarm (e.g., flashing lights). It should be understood that controller 138 may also send an alarm notice to remote interface device 140.

In operation, remote interface device 140 may be used to initiate a mixing and delivery operation. Remote interface device 140 causes controller 138 to open valves 112 as required for the desired mixture of water stored in water tank 14 and liquid stored in liquid storage tanks 18. Pump 116 is activated drawing the mixture from inlet manifold 114 and providing it to flow meter 118. Controller 138 also opens control valve 120 and low flow valve 124 to provide the mixture to outlet manifold 126. Controller 138 causes liquid from auxiliary liquid storage tanks 20 and additives from additive storage tanks 22 to be added to outlet manifold 126 by activating pump/flow meters 128 and inlet valves 130. The final mixture is delivered to discharge valves 132, 134. Finally, controller 138 activates the desired discharge valve 132, 134 to provide the final mixture to load outlet container 24.

At the end of the order when delivery is complete, controller 138 closes control valve 120 and maintains low flow valve 124 in an opened position. Controller 138 then opens purge valve 122 to inject pressurized air (e.g., from compressor 136) into the plumbing downstream from control valve 120. In this manner, the mixture downstream from control valve 120 (which has been measured and is part of the current order) is forced out of container 72 into load outlet container 24.

Figure 8:
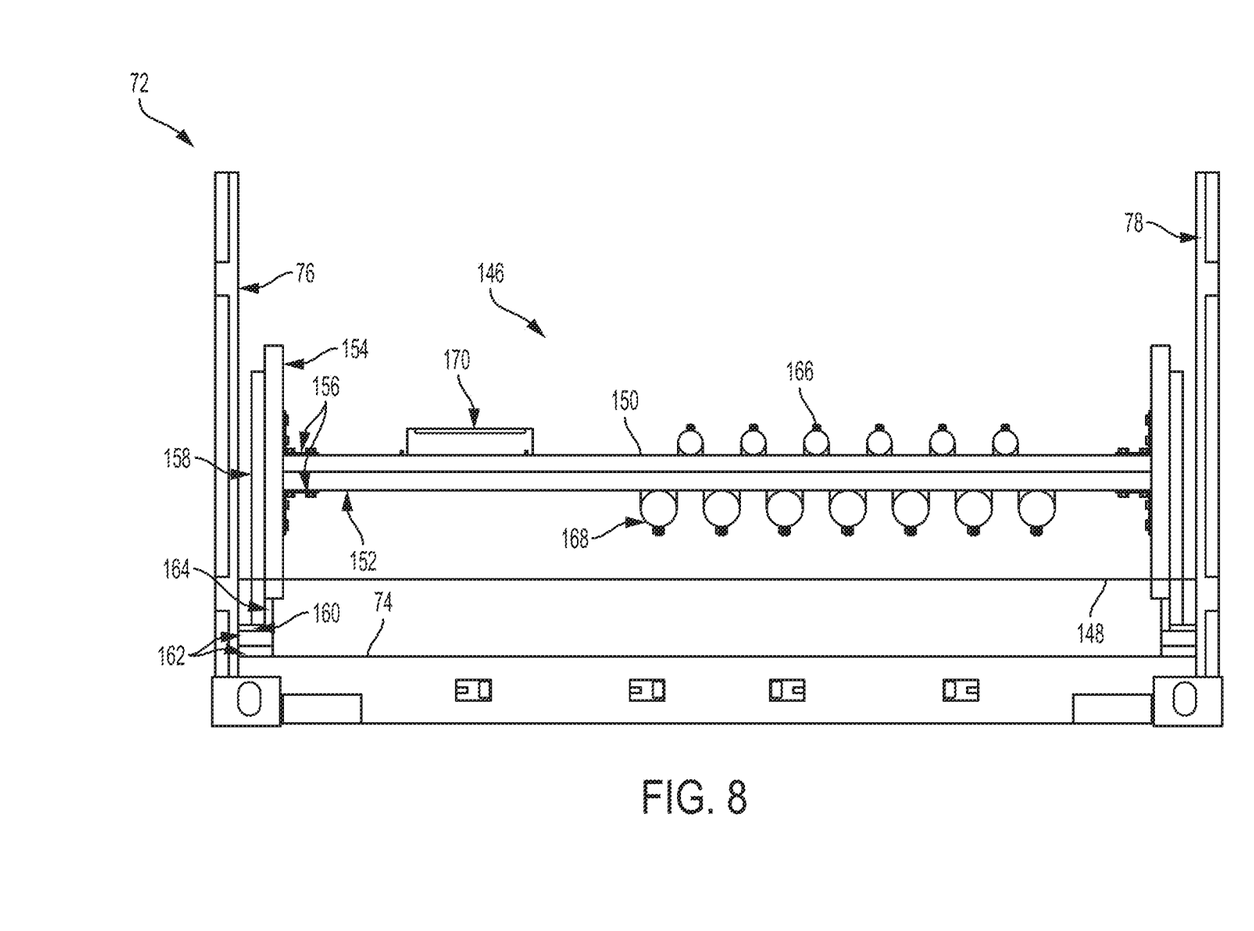
FIG. 8 is an end view of a mounting bracket of the mixing station of FIG. 7.

Referring now to FIG. 8, a support bracket 146 for container 72 is shown. Support bracket 146 is disposed in third room 110 behind end wall 92 (which is not shown). FIG. 8 also depicts a containment membrane 148 which lines the bottom portion of third room 110 to contain any leaks that may occur. Bracket 146 includes stacked cross beams 150, 152 and a pair of struts 154. Struts 154 are connected to beams 150, 152 by angle braces 156. Struts 154 are welded to C-channels 158 which are coupled to floor 74 of container 72 via steel plates 160 and treated 2×4s 162. Plywood 164 is disposed between the lower end of struts 154 and 2×4s 162. In this manner, no fasteners are used to connect bracket 146 directly to container floor 74 or side walls 76, 78, thereby maintaining the integrity of container 72. A plurality of pipe runs 166 are connected to cross beam 150 for receiving and supporting plumbing coupled to additive storage tanks 22. Similarly, a plurality of pipe runs 168 are connected to cross beam 152 for receiving and supporting plumbing coupled to water tank 14, liquid storage tanks 18 and auxiliary liquid storage tanks 20. Finally, bracket 146 includes a brace 170.

It should be understood that multiple support brackets 146 may be positioned along the length of third room 110 to form joists for supporting the various components described with reference to FIG. 7 above floor 74 of container 72. A walkway may be attached to braces 170 of each support bracket 146 to permit access to the components of the system. In the manner described above, container 72 provides a mounting system that requires no fasteners to penetrate the container walls, ceiling or floor, will not shift or move during transport of container 72 and supports all of the mixing equipment above a liquid containment membrane 148.

Figure 9:
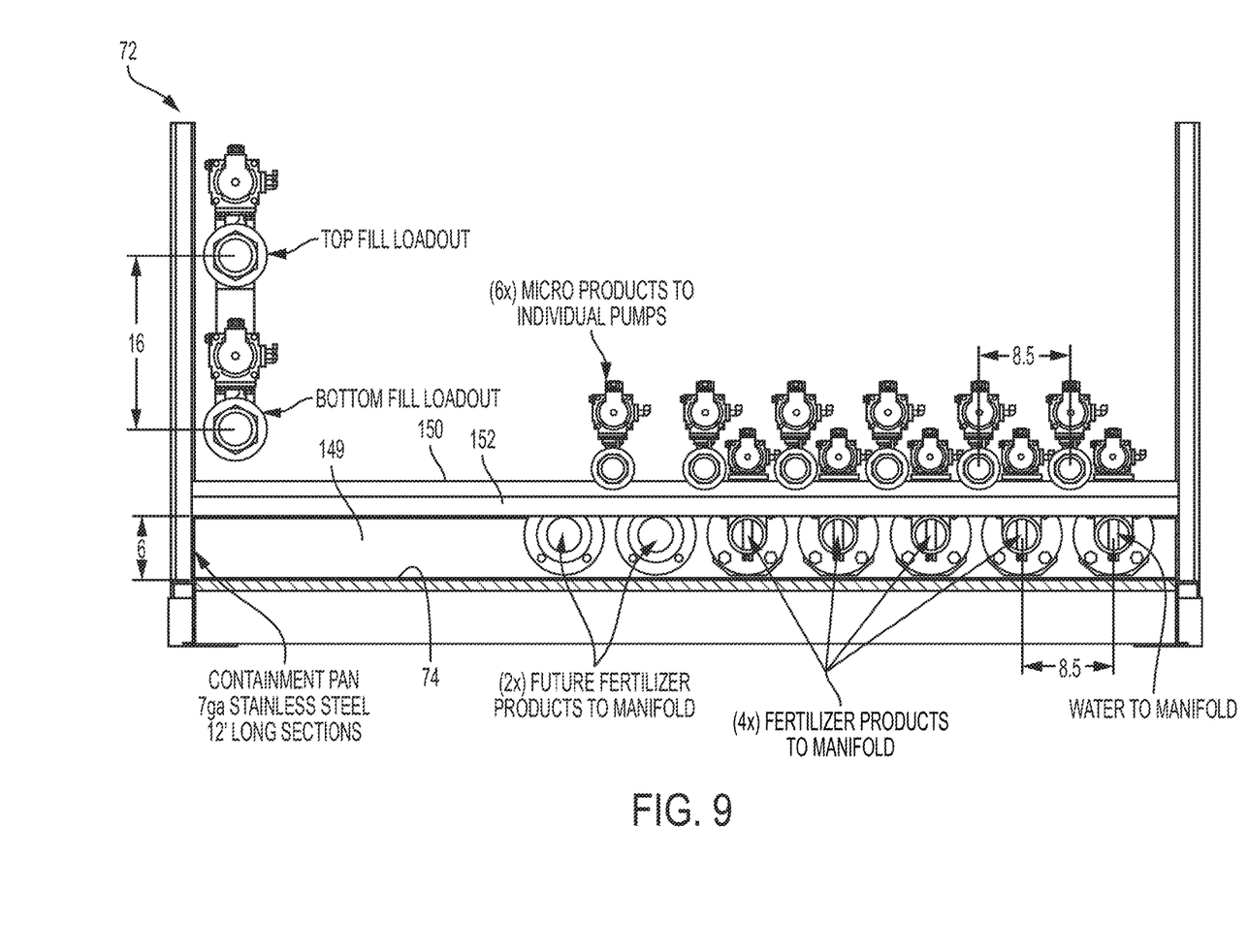
FIG. 9 is an end view of components associated with an end wall of a mixing station according to the present disclosure.
Figure 10:
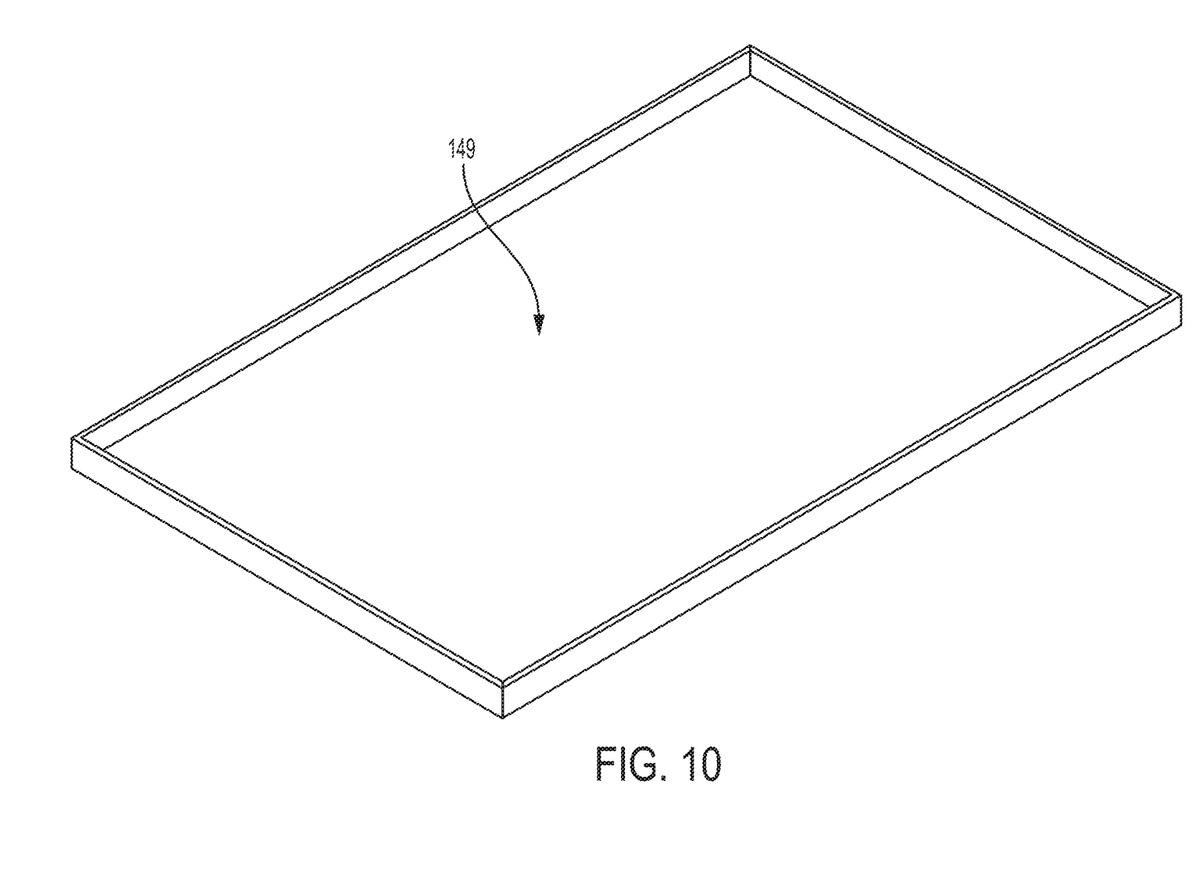
FIG. 10 is a perspective view of a containment pan according to one embodiment of the present disclosure.

In another embodiment depicted in FIGS. 9 and 10, an alternative liquid containment apparatus is shown. As shown, a containment pan 149 is provided on floor 74 of container 72. In this embodiment, containment pan 149 may be formed of stainless steel and welded into a large single pan or several smaller pans. The support structure for the various pumps, valves, plumbing and sensors described above could then be welded directly to the floor of pan 149. A drain valve (not shown) may be fitted to a side wall of pan 149 to allow any liquids collected by pan 149 to be easily recovered. Additionally, braces 170 (which may support a walkway) may be supported by legs fastened to the floor of pan 149. It should further be understood that the walls of container 72 in third room 110 (described below) could be lined with a membrane configured to drain into pan 149 to catch any liquid sprayed on the side walls from the equipment.

As should be apparent from the foregoing, the doors 80, 86 at each end 82, 88 of container 72 and internal walls 94, 98, 104 provide areas for the different types of equipment to be utilized in dispensing liquids. Mechanical equipment may be securely contained in third room 110 and electrical equipment (e.g., motor controls for pumps, transmitter for flow meters, controller 138 and a control panel, etc.) may be securely contained in second room 108. Office equipment (e.g., a printer, display, charging station, etc.) may also be securely contained in first room 102. All components of container 72 may be fully assembled and tested as a unit prior to shipment to a remote site such as on a sea-going vessel. Upon arrival at the liquid dispensing site, doors 86 are opened exposing end wall 92 where the internal plumbing and connecting pipes are available for the onsite tanks without cutting openings in side walls 76, 78 of container 78 for the plumbing or electrical inputs, which would thereby render container 72 unsuitable for shipping via a sea-going vessel after its initial use.

The interior walls 92, 94, 98, 104 provide basic security when container doors 80, 86 are open. When doors 80, 86 are closed, the equipment of container 72 is in a secure, weather resistant enclosure. Container 72 may easily be placed into service at one dispensing site and later closed up and shipped again on a sea-going vessel and/or truck to another dispensing site. This can be done with a minimum amount of set up labor and recalibration of the measuring devices.

Each of rooms 102, 108, 110 may be fully insulated, thereby reducing noise pollution external to container 72 and permitting efficient temperature control within container 72. It should be understood that container 72 may include one or more heating and/or cooling systems (not shown) to maintain a desired temperature and humidity level within container 72, which may be shipped for use in various warm and cool climates.

Figure 11:
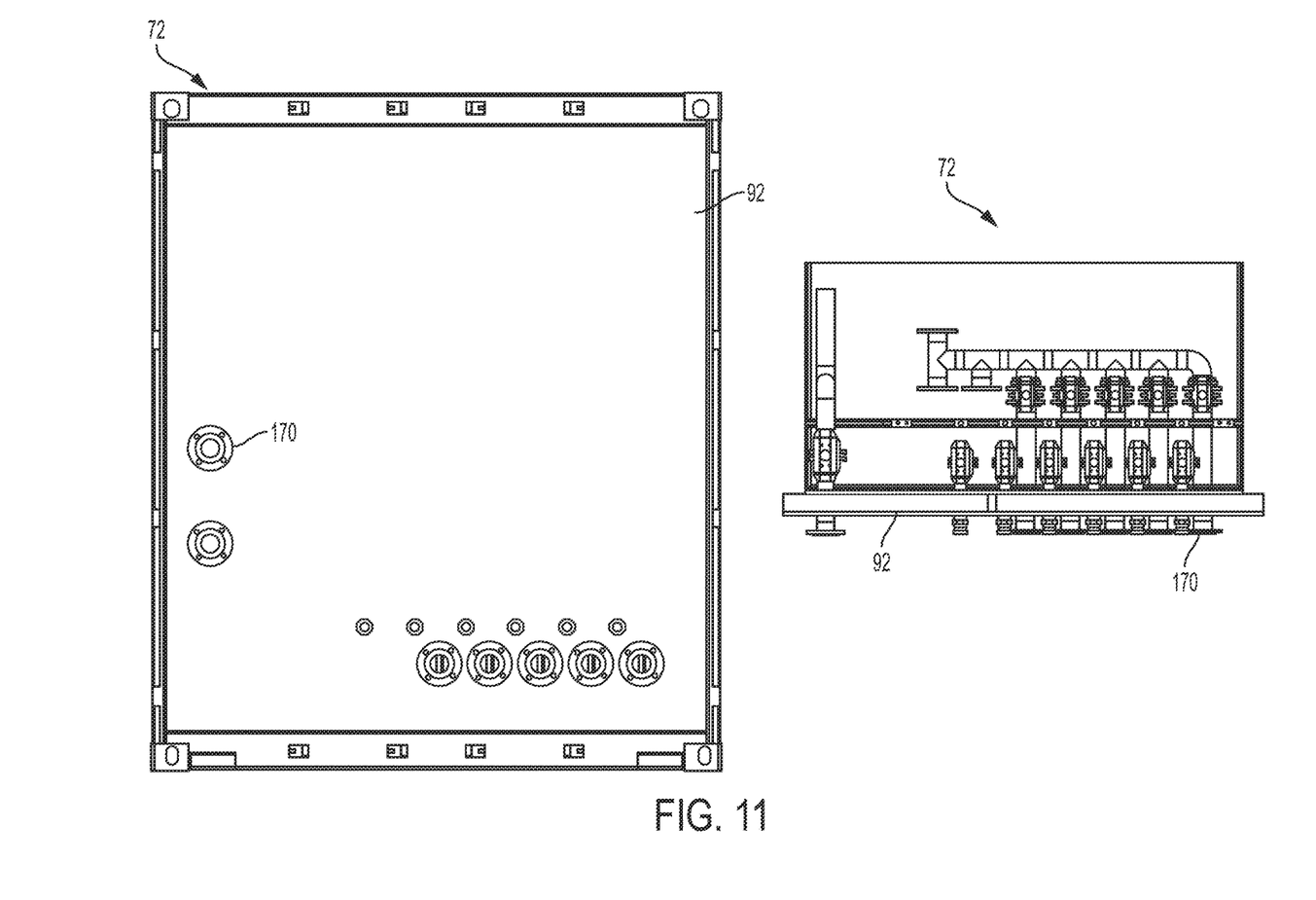
FIGS. 11 and 12 provide additional views of an end wall and associated components of a mixing station according to the present disclosure.
Figure 12:
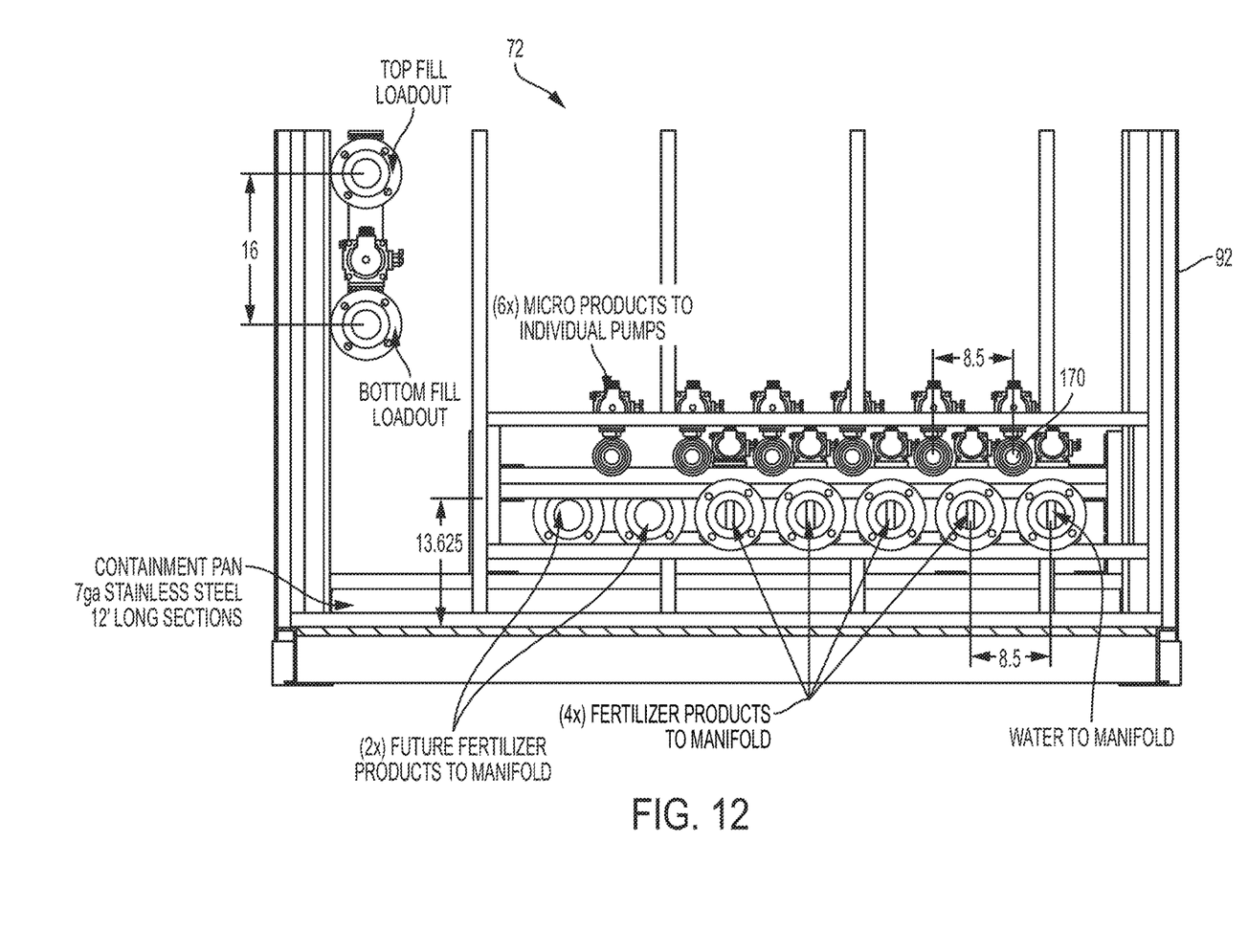

End wall 92 includes a plurality of quick release couplings 170 which permit secure coupling to the various tanks on site and rapid disconnections for moving container 72 to a new dispensing location. FIGS. 11 and 12 provide additional views of end wall 92 and couplings 170 for one embodiment of container 72. It should be understood that container 72 may be left on the trailer used to transport it to the dispensing site or removed from the trailer and placed on the ground or other slab or platform.

The connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

We claim:

1. A mixing station, comprising:
   a shipping container having a floor, a pair of side walls and at least one door at one end of the container;
   an end wall positioned adjacent the one end of the container, the end wall including a plurality of couplings;
   at least one internal wall disposed within the container to define, with the end wall and the side walls, a room; and
   mixing components disposed within the room;
   wherein ingredients external to the container are provided to the mixing components through the plurality of couplings in the end wall and a final mixture of the ingredients is provided from the mixing components to an output container through the plurality of couplings such that the side walls of the container are not structurally compromised.

2. The mixing station of claim 1, wherein the at least one door includes a first door at the one end of the container and a second door at another end of the container, and the at least one internal wall includes a first wall disposed within the container to define, with the end wall and the side walls, the room, a second wall disposed within the container adjacent the other end of the container, and a third wall disposed within the container adjacent the second wall to define, with the second wall and the side walls, a second room.

3. The mixing station of claim 2, wherein the at least one internal wall further includes a fourth wall disposed within the container adjacent the third wall to define, with the third wall and the side walls, a third room.

4. The mixing station of claim 3, further including a controller configured to operate the mixing components and a remote interface device configured to operate the controller, the remote interface device being disposed within the second room and the controller being disposed within the third room.

5. The mixing station of claim 1, wherein the mixing components include a plurality of inlet valves coupled to a corresponding first plurality of pipe runs disposed adjacent the end wall and configured to couple through the end wall to a plurality of liquid storage tanks, each of the inlet valves having an outlet coupled to an inlet manifold.

6. The mixing station of claim 5, wherein the mixing components further include a pump and a mass flow meter, the pump having an inlet coupled to an outlet of the inlet manifold and an outlet coupled to the mass flow meter.

7. The mixing station of claim 6, wherein the mass flow meter provides information to a controller that controls the operation of the inlet manifold, and the mixing components further include a control valve having an inlet coupled to an outlet of the mass flow meter and an outlet coupled to an inlet of a low flow valve.

8. The mixing station of claim 7, wherein the mixing components further include an outlet manifold having an inlet coupled to the outlet of the low flow valve and an outlet coupled to at least one discharge valve coupled though the end wall to the output container.

9. The mixing station of claim 8, wherein the mixing components further include a plurality of second pumps coupled to a second plurality of pipe runs disposed adjacent the end wall and configured to couple through the end wall to a plurality of auxiliary liquid storage tanks and a plurality of additive storage tanks, the plurality of second pumps each having an outlet coupled to the outlet manifold.

10. The mixing station of claim 9, wherein the plurality of second pumps are controlled by the controller.

11. The mixing station of claim 9, wherein the mixing components further include a purge valve coupled between the control valve and the low flow valve, the controller being configured to discontinue delivery of the final mixture by causing the control valve to close and causing the purge valve to inject pressurized gas into the inlet of the low flow valve, thereby forcing the final mixture out of the outlet manifold and into the output container.

12. The mixing station of claim 1, wherein the room includes a leak sensor configured to detect the presence of leaked fluid into the room.

13. The mixing station of claim 12, wherein the leak sensor provides a leak signal to a controller in response to the presence of leaked fluid in the room, the controller being configured to activate an alarm in response to the leak signal.

14. The mixing station of claim 1, further comprising a support bracket disposed in the room adjacent the end wall, the support bracket include a plurality of pipe runs configured to receive plumbing coupled to at least one liquid storage tank, at least one auxiliary liquid storage tank, and at least one additive storage tank, the support bracket being situated in the room without using fasteners to connect the bracket to the side walls or the floor.

15. The mixing station of claim 1, further including a containment membrane disposed within the room and configured to contain any leaked fluid from the mixing components.

16. The mixing station of claim 1, further including a containment pan disposed on the floor in the room and configured to support at least some of the mixing components.

17. A method of mixing ingredients at a first location having at least one liquid storage tank, at least one additive storage tank, and an output container, and at a second location having at least one liquid storage tank, at least one additive storage tank, and an output container, comprising:

delivering a portable mixing station to the first location, the mixing station including
a shipping container having a floor, a pair of side walls and at least one door at one end of the container,
an end wall positioned adjacent the one end of the container, the end wall including a plurality of couplings,
at least one internal wall disposed within the container to define, with the end wall and the side walls, a room, and
mixing components disposed within the room;
receiving, by the mixing components, ingredients from the at least one storage tank at the first location and the at least one additive storage tank at the first location through the plurality of couplings in the end wall; and
delivering, by the mixing components, a final mixture of the ingredients to the output container at the first location through the plurality of couplings such that the side walls of the container are not structurally compromised;
moving the portable mixing station from the first location to the second location;
receiving, by the mixing components, ingredients from the at least one storage tank at the second location and the at least one additive storage tank at the second location through the plurality of couplings in the end wall; and
delivering, by the mixing components, a final mixture of the ingredients to the output container at the second location through the plurality of couplings such that the side walls of the container are not structurally compromised.

18. The method of claim 17, wherein the mixing components include a plurality of inlet valves coupled to a corresponding first plurality of pipe runs disposed adjacent the end wall and configured to couple through the end wall to the at least one liquid storage tank at the first and second locations, each of the inlet valves having an outlet coupled to an inlet manifold.

19. The method of claim 18, wherein the mixing components further include a pump and a mass flow meter, the pump having an inlet coupled to an outlet of the inlet manifold and an outlet coupled to the mass flow meter.

20. The method of claim 19, wherein the mass flow meter provides information to a controller that controls the operation of the inlet manifold, and the mixing components further include a control valve having an inlet coupled to an outlet of the mass flow meter and an outlet coupled to an inlet of a low flow valve.

21. The method of claim 20, wherein the mixing components further include an outlet manifold having an inlet coupled to the outlet of the low flow valve and an outlet coupled to at least one discharge valve configured to couple though the end wall to the output container at the first location and the output container at the second location.

22. The method of claim 17, further comprising detecting the presence of a fluid leakage into the room.

* * * * *